BOOSTER CAP ASSEMBLY

Original Filed Dec. 27, 1968

United States Patent Office

Re. 28,228
Reissued Nov. 5, 1974

28,228
BOOSTER CAP ASSEMBLY

Donald P. Graham, South Bend, Ind., assignor to Hercules, Inc., Wilmington, Del.

Original No. 3,640,222, dated Feb. 8, 1972, Ser. No. 787,413, Dec. 27, 1968. Application for reissue Dec. 3, 1973, Ser. No. 421,299
Int. Cl. F42b *3/10*
U.S. Cl. 102—24 R 14 Claims

Matter enclosed in heavy brackets [ ] appears in the original patent but forms no part of this reissue specification; matter printed in italics indicates the additions made by reissue.

ABSTRACT OF THE DISCLOSURE

A booster unit containing a small base charge, and adapted to slip over the end of a cap-, or fuse-type primary initiator to support the base charge in detonating relationship with the primary initiator; and resulting combination of booster unit and the primary initiator as a new booster assembly. The invention is advantageously applied to the elimination of need for conventional dynamite, or cast booster charge, primers for shooting relatively insentive explosives such as those of the aqueous inorganic oxidizer slurry types, and ANFO's.

Figure 1:
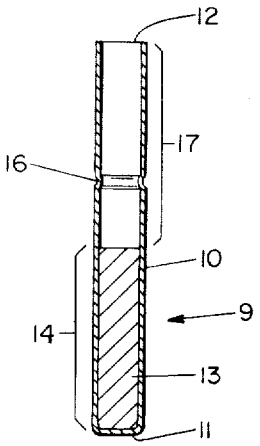

This invention relates to new initiating structure for explosives, particularly advantageously applied to the detonation of relatively insensitive explosives such as of the aqueous inorganic oxidizer salt, and prilled ammonium nitrate-fuel oil (ANFO), types.

Conventional booster assemblies for initiaton of explosive charges are well known. They generally comprise a suitable shell with a pressed, or cast, high explosive charge therein, a well member extending through one end of the shell in water-tight relationship therewith into the body of high explosives so as to support a cap-, or fuse-type primary initiator in detonating relationship with the high explosive charge. These assemblies generally utilize from 15–500 grams or more of high explosive and often have diameters in the order of from 0.6 to 4 inches and greater.

Normal practice in the initiator of relatively insensitive explosives, and particularly those above referred to, is "prime" or initiate those explosives with a cap-sensitive grade of dynamite commonly referred to as a "primer," or with a conventional cast booster. The primer, and cast booster, is each usually initiated by an electric, or nonelectric, blasting cap of No. 6 or No. 8 strength.

In the initiation of ANFO's, in which the practice has been particularly directed toward the use of a cap-sensitive dynamite primer, it has been desirable for safety reasons to maintain the sensitivity of the dynamite primer at as low a level as possible within the cap-sensitivity range, without impairment of operation of the standard cap strength primary primary initiator. However, due to inherencies in the manufacture of dynamites, it has not been possible to closely control production at the desired minimum sensitivity level and hence it has been necessary to direct production toward a higher than desired sensitivity. Hence, sensitivity of the dynamite primer has necessarily been at an unduly high level within the cap-sensitivity range with accompanying safety hazards involved.

Alternatively, it has been the practice in some instances to lower the sensitivity of the dynamite primer and utilize a stronger primary initiator, e.g., an electric or nonelectric initiator of about No. 12 strength. That practice reduces the safety hazards but also eliminates utilization of standard strength cap-type initiators which in turn requires a separate inventory of an entire series of "special" initiators, including those at all of the various delay levels, which is costly from the standpoint of the required additional inventory and handling in the field.

Additionaly, in the use of nonelectric-type cap initiators, i.e., initiated by a detonating cord, it has been necessary to balance the sensitivity of the dynamite at a level at which it will not be detonated by the detonating fuse leading to the cap, instead of being subsequently detonated by the cap; and this is of course important in view of the necessary delay that is generally required in multihole shooting, and which is provided by a delay system in each cap. However, dynamite manufacture, as above described, with its uncertainties, often leads to formation of product of unsatisfactory sensitivity for this practice, i.e., resulting either in failure, or in premature firing.

A still further disadvantage in the utilization of dynamite primers for ANFO's and, relatively insensitive explosives in general, is the need for handling and shipping of the dynamite explosive which involves obvious safety hazards and of course added costs incurred in compliance with regulations involving storage and transport of high explosives.

The use of conventional cast or pressed booster-type charges in conjunction with electric- or nonelectric-type cap initiators, is economically undesirable as compared with use of dynamite primers, particularly in the use of ANFO's. Further, such use of cast boosters requires the manufacture, handling and storage of high explosives which is undesirable, as above described, particularly with reference to costs involving storage and transport.

This invention is concerned with an initiating system for relatively insensitive explosives, particularly applicable to ANFO's, which eliminates need for a dynamite, or conventional booster type, primer, but which nevertheless effects initiation of the relatively insensitive explosive utilizing a primary initiator of standard blasting cap strength; the invention thereby eliminating safety and economic problems inherent in initiation practices heretofore. The invention is based on the discovery of a booster unit of very small charge of high explosive, and a combination of same with a primary initiator of standard strength, which can be quickly and reliably utilized in initiation of relatively insensitive explosives, and particularly ANFO's, with marked improvement in safety and economics.

In accordance with the invention a booster unit adapted to slip onto the end of a standard cap- or fuse-type, primary initiator to form a resulting booster assembly is provided, which comprises an elongated shell member closed only at one end and having a transverse cross section at its open end correlated with the transverse cross section of an elongated primary initiator so as to coaxially encompass, and supportably engage, at least one end of said initiator within said open end, being thereby adapted to be slipped over the end of said initiator in supporting relationship therewith; from 1 to 6 grams of a secondary high explosive in the closed end of said elongated booster shell; and said booster shell being of a sufficient length to provide said open end section thereof for engaging said primary initiator as described.

Further in accordance with the invention, a combination of the above-described booster unit with primary initiator means therefore is provided to form a booster assembly ready for firing, which comprises said booster unit, and an elongated primary initiator therefor having a maximum strength of a No. 8 blasting cap; and the shell of said booster unit being disposed substantially coaxially with said primary initiator with the open end portion of said shell in slipped over position around an end portion of said primary initiator to place said primary initiator in detonating relationship with said high explosive in said booster unit.

In preferred practice, the above-described booster shell is in the order of from 2 to 5 inches in length, and the length of the pressed high explosive charge, e.g., charge 13 of FIG. 1, is generally from about one-quarter to five-eighths of the length of the shell.

Figure 2:
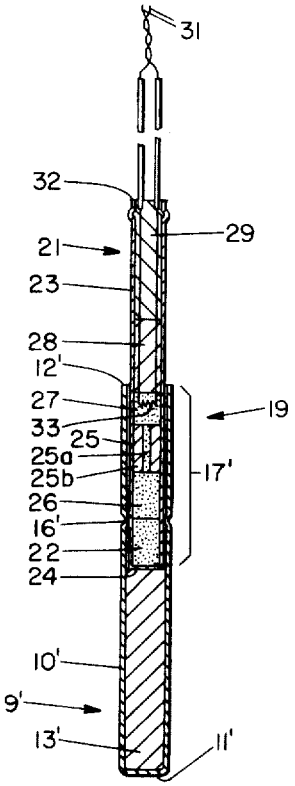
Figure 3:
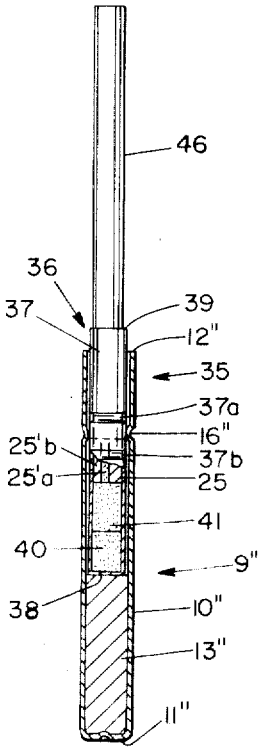
Figure 4:
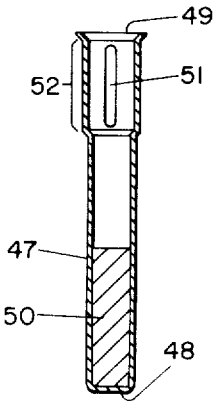

The invention is further illustrated with reference to the drawings of which FIG. 1 shows a booster unit of the booster assembly; FIG. 2 shows a booster unit of FIG. 1 in combination with an electric blasting cap, as a primary initiator, to form the booster assembly; FIG. 3 shows a booster unit of FIG. 1 in combination with a nonelectric cap and a detonating fuse initiator therefor, as a primary initiator to form the booster assembly and FIG. 4 shows an embodiment of indentation means in the shell of the booster unit for support of a primary initiator therein. All parts of FIGS. 2 and 3 which are like parts of FIG. 1 are indicated by the same, but appropriately primed numbers.

Referring to FIG. 1, booster unit 9, for a cap booster assembly of the invention, comprises an elongated tube 10 closed at bottom end 11 and open at top end 12; and containing a booster charge 13, such as PETN, tetryl, RDX, pentolite, or other suitable high crystalline explosive, present in the bottom end portion 14, i.e., adjacent end 11. Indentations 16 in the wall of open end portion 17 of tube 10 and protruding into the interior thereof are disposed along any suitable path generally along the circumference of tube 10.

Referring to FIG. 2, complete booster assembly 19 comprises an electric blasting cap as primary initiator 21 and booster unit 9' which is the same as booster element 9 of FIG. 1.

Primary initiator 21 is a suitable electric blasting cap, of No. 8 strength or less, which is of conventional design and can be of the delay or "instantaneous" type, as desired. Initiator 21 comprises elongated cap shell 23; base charge 22, such as PETN, tetryl, pentolite or the like, in the bottom end of shell 23, primer charge 26 such as diazodinitrophenol, or other suitable primer composition, superposed on base charge 22; delay fuse 25 superposed on primer charge 26; and ignition charge 27 such as a lead-selenium, or other suitable ignition mixture, superposed on delay fuse assembly 25; ignition plug 28 superposed on ignition composition 27; top closure plug 29 superposed on ignition plug 28; and leg wires 31 extending parallel into cap shell 23 through the open end 32 thereof and through plugs 29 and 28 into termination in ignition composition 27, and connecting therein with bridge wire 33. As is well known, base charge 22 is in detonating relationship with primer 26 to detonate in response to detonation of primer 26; primer 26 is in turn in detonating relationship with the delay fuse 25 to detonate in response to ignition of the delay fuse, such as of the barium peroxide/selenium or tellurium type, and forming core 25a in lead tube 25b, which in turn is in ignition relationship with ignition composition 27, to ignite in response to ignition of composition 27 in turn ignitable in response to heat from bridge wire 33 generated by passage of an electric current therethrough from leg wires 31, and a suitable power source not shown.

Cap 23 is of transverse cross section less than that of tube member 10'; and tube member 10' is disposed with the open endmost portion 17' thereof in coaxially slipped over position around the endmost portion of primary initiator 21 containing base charge 22 to place charge 22 in detonating relationship with charge 13'. Tube 10' is engaged along indentations 16' in forced contact with cap shell 23 [of] *in* tube 10' to support shell 23 in position in tube 10' in detonating relationship with charge 13'. Although the entire endmost portion 17' of tube member 10' is generally in slipped over position around the elongated primary initiator, only a section thereof need be slipped over the primary initiator, it being required only that the slipped over position provide for the requisite detonating relationship between the primary initiator and the explosive charge 13' in the booster unit.

Referring to FIG. 3, booster assembly 35 comprises a booster unit 9'', the same as units 9 and 9' discussed above, slipped over a primary initiator 36 which is a fuse cap, with delay fuse, including detonating cord 46 therefor. Primary initiator 36 comprises elongated shell 37 with closed end 38 and open end 39; base high explosive charge 40, as for example, a pressed PETN, in an end section of shell 37, adjacent end 38; a primer composition 41 superposed on base charge 40, such as diazodinitrophenol; a delay fuse 25 with core 25'a and lead tube 25'b, the same as that of FIG. 2, superposed on primer charge 41, and detonating cord 46 extending into shell 37 through open end 39 into contact with fuse assembly 25, and supported in shell 37 by force fit with at least one inwardly extending circumferential crimp, 37a; and the delay primer and base charge elements being further supported in position in shell 37 by inwardly extending circumferential crimp 37b in the wall of shell 37 and extending around fuse 25. The relationship of base charge primer and delay elements of FIG. 3 is the same as that described with reference to those elements of FIG. 2, the delay element in FIG. 3 being in ignition relationship with detonation cord 46.

Booster element 9'' is coaxially disposed with its open endmost portion slipped over shell 37 to place charge 40 in detonating relationship with charge 13'' in tube 10'' as described with reference to the relative positioning of the booster unit and the primary initiator FIG. 2. Shell 37 is supported in tube 10'' by force fit with inwardly extending indentations 16'' in the wall of shell 10''. Detonating fuse 46, generally a plastic cord with a core of high explosive, i.e., of the detonating cord type, is of loading of from 1 to 6 grains PETN (or equivalent) per foot.

Referring to FIG. 4, another embodiment of shell structure for a booster unit of the invention is shown which comprises an elongated shell 47 closed at bottom end 48, open at top end 49 and containing inwardly protruding indentations 51 in the open endmost wall portion 52. End wall portion 52 is of slightly larger diameter than the remaining portion of tube 47 and supports grooves 51 inwardly extending and terminating so as to permit insertion of a primary initiator into the open end of shell 47 substantially in contact with charge 50 [but] *with the grooves 51* in force fit supporting relationship with the primary initiator. Indentations 51 thus longitudinally extend parallel to the axis of tube 47 to frictionally engage the primary initiator to support it in the open end of the shell section 52. Generally, from 3 to 5 substantially equispaced indentations 51 are utilized and as in the case of indentations 16, 16' and 16'', often extend toward the interior of the booster shell for a distance of from about 0.01 to 0.05 inch.

The dimensions of the complete booster assembly are such that from 1 to 6, more often 1 to 3, grams of secondary high explosive booster charge can be utilized in the booster unit. Thus, an assembly in which the booster unit shell, e.g., shell 9 of FIG. 1 is about 2⅛ inches in length by 0.3 inch in diameter, advantageously contains 1 gram of PETN pressed to a shell length of five-eighths inch, at a density in the order of from 1.3 to 1.4 gram per cc. allowing 1½ inch for support of a primary initiator. Further exemplary is a 2-gram booster charge in a booster unit shell of 2⅝ inches in length pressed to 1¼ inches, allowing 1⅜ inches for support of the primary initiator. Generally, from about one-fourth to five-eighths of the length of the booster unit is charged with booster explosive, although the column 4 booster charge is more often about one-half the length of the booster shell.

In a group of eight shots, each in a separate 1¼×8-inch borehole, and ANFO (94 percent ammonium nitrate, 6 percent fuel oil) was emplaced in each hole and detonated with a complete booster assembly of FIG. 2 containing 2 grams of PETN and in which the base charge of the booster assembly was PETN at a pressed density of 1.4 gram per cc. The rock formation containing the set of boreholes, was well fragmented, thus indicating success of the shots.

Although the primary initiator in practice of most embodiments, is an electric, or nonelectric, cap initiator of not more than standard No. 8 cap strength, the primary initiator can, when desired, be a standard detonating cord of the Primacord type, e.g., at a core loading of say up to about 60 grains PETN (or equivalent) per foot.

A now-preferred utilization of the booster assembly of the invention is in the borehole shooting of ANFO type charges to accomplish earth fragmentation for mining. In this practice, the shooting is carried out in small diameter holes, and the ANFO is blown into the borehole from a pressure pot, preferably by an injector-type blower. In operation, a delivery hose extends from the blower into the borehole so as to approach the bottom (or rear) of the hole. The blower is then placed in operation and the ANFO is blown in to fill the hole and as the hole is filled, the hose is withdrawn from the hole, i.e., at a rate substantially the same as the rate at which the ANFO fills the hole.

The booster unit is readily slipped over the primary initiator, such as a delay-type electric blasting cap of about No. 6 strength. The booster assembly is positioned in the borehole by first placing it inside the delivery hose and leading the lead wires along the hose to the power source outside the hole; and then moving it from the hose, as part of the moving ANFO, into emplacement at a point predetermined by its initial location in the hose, so that it is a few inches from the back of the hole and is facing to the front. The booster assembly is supported in emplacement by the weight and pressure of the subsequently delivered ANFO.

In preferred practice the shell structure of the booster unit, and of the electric and nonelectric cap primary initiator, is tubular, and hence of circular cross section; as, of course, is the detonating fuse of the fuse-type initiator utilized in practice of some embodiments.

It will be evident to those skilled in the art, various modifications can be made or followed, in light of the foregoing disclosure and discussion without departing from the spirit or scope of the disclosure or from the scope of the claims.

What I claim and desire to protect by Letters Patent is:

1. A booster assembly [comprising] *having* a booster unit slipped onto [a] *an elongated* cap-, or fuse-type primary initiator, comprising, as said booster unit, an elongated shell open at one end and closed at the other end, *and* from 1 to 6 grams secondary high explosive within and completely filling, a closed end section of said shell [, and the remaining section of said shell being open and unobstructed]; said primary initiator having an external transverse cross section sufficiently less than, and correlated with, the internal transverse cross section of [said] *an* open end shell section *of said booster unit* so as to permit at least an *initiating* end portion of said *primary* initiator to be coaxially disposed within said open end shell section in [force fit] *substantially* closing relationship with said shell along substantially the entire external primary initiator surface within said *open end* shell *section and in initiating relationship with said secondary high explosive; indentation means extending into said open end shell section from the external wall thereof; and* said booster unit [, at its] *having said* open end [,] *shell section* [coaxially] slipped [in said force fit] on to at least [an] *said initiating* end portion of said primary initiator *in force fit relationship of said indentation means with said primary initiator and* with said secondary high explosive in detonating relationship with said primary initiator [; and crimp means on the external wall of said open end shell section extending into supporting contact with said initiator therein].

2. A booster assembly of claim 1 wherein said primary initiator is an electric blasting cap.

3. A booster assembly of claim 1 wherein said primary initiator is a fuse cap, and a detonating fuse element therefor.

4. A booster assembly of claim 1 wherein said shell is [a] *of* circular cross section from 2 to 5 inches in length and from 0.2 to 0.4 inch in dimetric cross section.

5. A booster assembly of claim 4 wherein said high explosive charge in said booster unit is PETN compressed to a density of at least 1.3 gram per cc.

6. A booster assembly of claim 1 wherein said primary initiator contains a delay fuse.

7. A booster assembly of claim 5 wherein said booster shell is about 2⅛ inches in length by 0.3 inch in diameter, and wherein said high explosive is about 1 gram of PETN compressed to a shell length of about five-eighths inch, thereby allowing 1½ inch for support of said primary initiator.

8. A booster assembly of claim 5 wherein said booster unit shell is about 2⅝ inches in length, and said high explosive charge is about 2 grams of PETN pressed to about 1¼ inches, thereby allowing about 1⅜ inches for support of said primary initiator.

9. A booster assembly of claim 1 wherein from about one-fourth to five-eighths of the length of the booster shell is charged with said high explosive.

10. A booster assembly of claim 9 wherein the column of said high explosive charge is in the order of about one-half the length of the booster shell.

11. A booster assembly of claim 1 wherein said elongated booster shell is of circular cross section.

12. A booster assembly of claim 1 wherein each of said open and closed end sections of said elongated shell is [of] circular *in* cross section, [and] *a top open end portion of* said *shell* [open end section] has a greater diametric cross section than that of *the remainder of said shell,* [said closed end section] *and said primary initiator is supported in said top end shell portion in said force fit relationship.*

13. A booster assembly [comprising] *having* a booster unit slipped onto [a] *an elongated* cap-, or fuse-, type primary initiator, comprising, as said booster unit, an elongated shell open at one end and closed at the other end, *and* from 1 to 6 grams secondary high explosive within, and completely filling, a closed end section of said shell [, and the remaining section of said shell being open and unobstructed]; said primary initiator having an external transverse cross section sufficiently less than, and correlated with, the internal transverse cross section of [said] *an* open end shell section *of said booster unit* so as to permit at least an *initiating* end portion of said *primary* initiator to be coaxially disposed within said open end shell section in [force fit] *substantially* closing relationship with said shell along substantially the entire external primary initiator surface within said *open end* shell *section and in initiating relationship with said secondary high explosive; means protruding into said open end shell section from the wall thereof for contacting said primary initiator as described hereinafter;* and said booster unit [, at its] *having said* open end [,] *shell section* [coaxially] slipped [in said force fit] on to at least [an] *said initiating* end portion of said primary initiator *in force fit relationship of said protruding means with said primary initiator and* with said secondary high explosive in detonating relationship with said primary initiator.

*14. A booster assembly comprising a booster unit slipped onto an elongated cap-, or fuse-, type primary initiator, comprising, as said booster unit, an elongated*

*shell open at one end and closed at the other end, from 1 to 6 grams secondary high explosive within, and completely filling, a closed end section of said shell; said primary initiator having an external transverse cross section sufficiently less than, and correlated with, the internal transverse cross section of said open end shell section so as to permit at least an end portion of said initiator to be coaxially disposed within said open end shell section in substantially closing relationship with said shell along substantially the entire external primary initiator surface within said shell, and force fit with said shell in said closing relationship; and said booster unit, at its open end, coaxially slipped in said force fit on to at least and end portion of said primary initiator with said secondary high explosive in detonating relationship with said primary initiator.*

References Cited

The following references, cited by the Examiner, are of record in the patented file of this patent or the original patent.

UNITED STATES PATENTS

| | | | |
|---|---|---|---|
| 2,125,356 | 8/1938 | Noddin | 102—29 |
| 2,558,134 | 6/1951 | Hall | 102—29 X |
| 2,707,437 | 5/1955 | Noddin et al. | 102—24 |
| 3,173,367 | 3/1965 | Shinpaugh | 102—28 |
| 3,212,438 | 10/1965 | Lawrence | 102—24 |

VERLIN R. PENDEGRASS, Primary Examiner

U.S. Cl. X.R.

102—28 R, 29

PO-1050
(5/69)

UNITED STATES PATENT OFFICE
CERTIFICATE OF CORRECTION

Patent No. Reissue 28,228 Dated November 5, 1974

Inventor(s) Donald P. Graham (Case 1)

It is certified that error appears in the above-identified patent and that said Letters Patent are hereby corrected as shown below:

Column 1, line 47 of Printed Patent; "initiate" should read --initiation--

Column 1, line 47 of Printed Patent; "to" is omitted;

Column 2, line 4 of Printed Patent; "additionaly" should read --additionally--

Signed and sealed this 14th day of January 1975.

(SEAL)
Attest:

McCOY M. GIBSON JR.
Attesting Officer

C. MARSHALL DANN
Commissioner of Patents